June 9, 1931.  J. W. HARDY  1,809,751
SUPPORT FOR CUTTER BARS OF MOWING MACHINES
Filed June 13, 1929
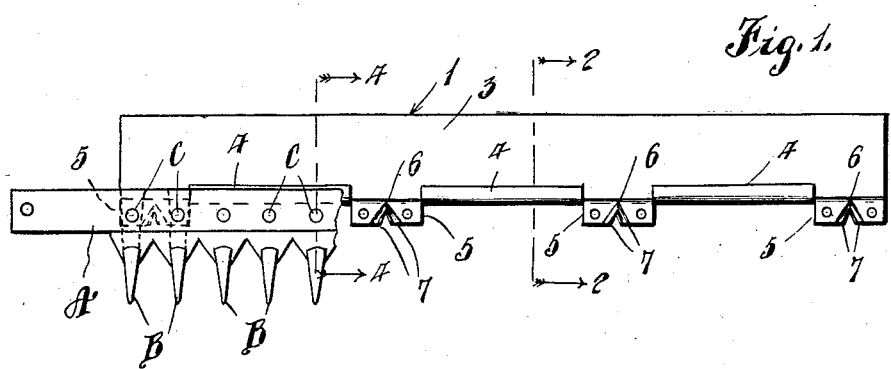
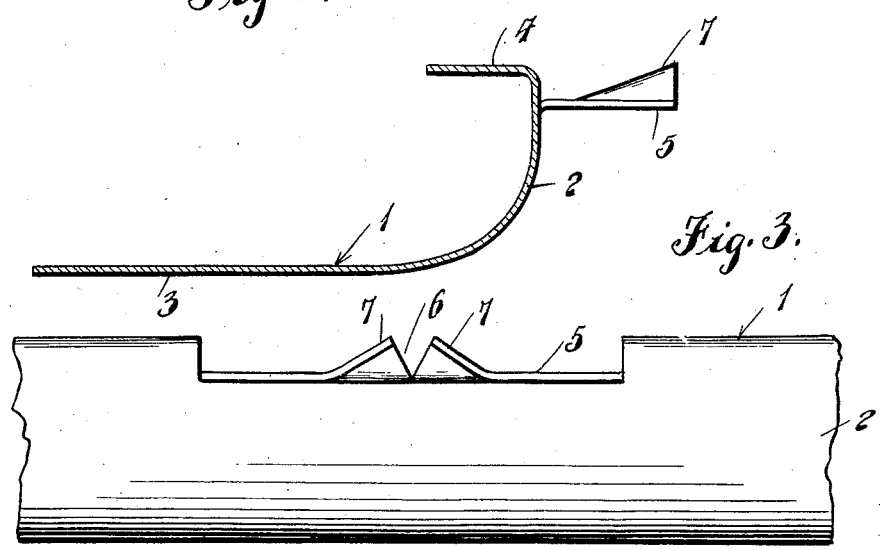
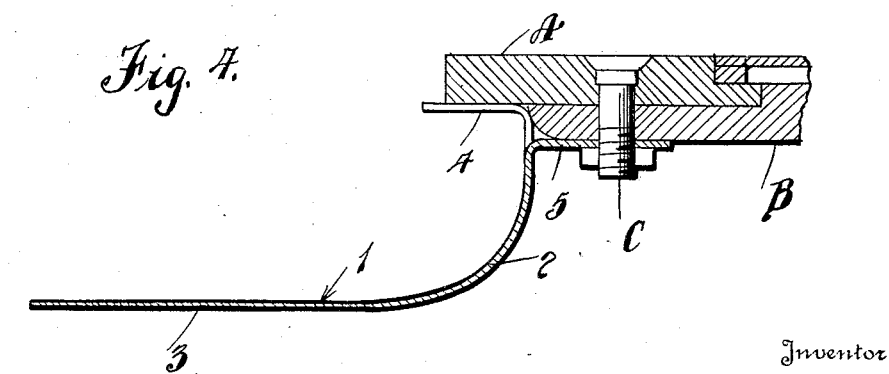
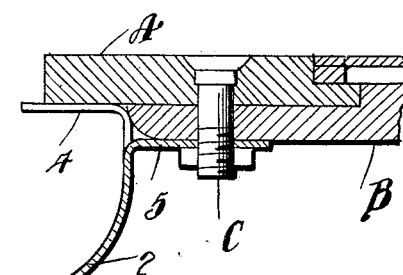
Inventor
J. W. Hardy.

Patented June 9, 1931

1,809,751

UNITED STATES PATENT OFFICE

JAMES W. HARDY, OF RUSSELLVILLE, ARKANSAS

SUPPORT FOR CUTTER BARS OF MOWING MACHINES

Application filed June 13, 1929. Serial No. 370,509.

The invention relates to mowing machines and has for its object the provision of a support for the cutter bar when the machine is used for cutting grain or grass over a stubble field to prevent breaking or dulling the cutting blades by contacting with stubble and with roots and stones.

To this end the invention consists in the provision of a plate adapted to be secured under the cutter bar and extending from end to end thereof, said plate having a downwardly and rearwardly curved extension that rides on the ground and that raises the cutter bar over obstructions as they may be encountered during the mowing operation to prevent dulling or breaking of the knives of the cutter blade.

The invention will be described in detail hereinafter and will be found illustrated in the accompanying drawings in which Figure 1 is a top plan view of the support for cutter bars of mowing machines showing it applied to a cutter bar shown fragmentarily, Figure 2 is a cross sectional view on a plane indicated by the line 2—2 of Figure 1, the figure being on a larger scale than that shown in Figure 1, Figure 3 is a front view of a fragment of the support, also shown on an enlarged scale, and Figure 4 is a transverse sectional detail on a plane indicated by the line 4—4 of Figure 1.

In the drawings similar reference characters are used to designate corresponding parts in all of the views.

In Figure 1 the support is shown applied to a fragment of mowing machine cutter bar designated A having guard fingers B. The support comprises a plate 1 having an upwardly curved portion 2 and a flat rear portion 3 that drags on the ground and over obstructions in the field when the device is in operation. The upper portion of the plate 1 is extended rearwardly as shown at 4 and engaging under the cutter bar A and forms a brace for the plate, and 5 indicates tongues integral with said plate and extending forwardly thereof and secured under the guard fingers B by means of bolts C attaching the guard fingers to the cutter bar A. The tongues 5 are split between the two guard fingers to which each tongue is attached as shown at 6 and the parts of the tongues adjacent to the split 6 are bent upwardly as shown at 7 to engage between the two guard fingers to which the tongues may be attached to brace the attachment of the support on the cutter bar.

When in use it will be apparent that the flat portion 3 by riding on the ground at the rear of the cutter bar serves to support the cutter bar above the ground and to prevent it contacting with stubble or roots or stones that may be in the field over which the machine is being operated.

What is claimed is:—

1. A support for mower cutter bars, comprising a plate attachable under a cutter bar and extending from end to end thereof, said plate being downwardly and rearwardly extended from said cutter bar and adapted to support it above the ground and obstructions thereon.

2. A device as set forth in claim 1 in which the part of the plate attached to the guard is provided with a rearwardly deflected portion adapted to engage under the cutter bar, and forwardly extended tongues adapted to be secured under guard fingers on the cutter bar.

3. A support for mower cutter bars, comprising a plate attachable and extending from end to end of a cutter bar, the plate provided with a rearwardly extending portion engageable under the cutter bar and integral, forwardly directed tongues adapted to be secured under guard fingers on the cutter bar, said tongues being split and bent upwardly on the two sides of the split to engage between adjacent guard fingers.

In testimony whereof I affix my signature.

JAMES W. HARDY.